(12) United States Patent
Sun et al.

(10) Patent No.: US 8,331,450 B2
(45) Date of Patent: Dec. 11, 2012

(54) METHODS AND SYSTEMS FOR IMAGE INTRA-PREDICTION MODE MANAGEMENT

(75) Inventors: Shijun Sun, Vancouver, WA (US); Louis Joseph Kerofsky, Portland, OR (US)

(73) Assignee: Sharp Kabushiki Kaisha, Osaka (JP)

( * ) Notice: Subject to any disclaimer, the term of this patent is extended or adjusted under 35 U.S.C. 154(b) by 1292 days.

(21) Appl. No.: 12/058,679

(22) Filed: Mar. 29, 2008

(65) Prior Publication Data

US 2008/0175321 A1    Jul. 24, 2008

Related U.S. Application Data

(63) Continuation of application No. 10/404,298, filed on Mar. 31, 2003, now Pat. No. 7,386,048.

(60) Provisional application No. 60/319,272, filed on May 28, 2002, provisional application No. 60/319,390, filed on Jul. 11, 2002.

(51) Int. Cl.
H04B 1/66 (2006.01)
(52) U.S. Cl. .................................. 375/240.15
(58) Field of Classification Search ............ 375/240.15–240.19; 382/232, 382/236, 238; H04B 1/66
See application file for complete search history.

(56) References Cited

U.S. PATENT DOCUMENTS

| | | | |
|---|---|---|---|
| 6,005,622 A * | 12/1999 | Haskell et al. | 375/240.24 |
| 6,108,448 A * | 8/2000 | Song et al. | 382/235 |
| 6,122,320 A * | 9/2000 | Bellifemine et al. | 375/240 |
| 6,341,144 B1 * | 1/2002 | Haskell et al. | 375/240.2 |
| 6,345,121 B1 | 2/2002 | Matsumoto | |
| 6,532,306 B1 * | 3/2003 | Boon et al. | 382/232 |
| 6,556,625 B2 * | 4/2003 | Haskell et al. | 375/240.2 |
| 6,668,095 B2 | 12/2003 | Rackett | |
| 6,765,964 B1 * | 7/2004 | Conklin | 375/240.14 |
| 6,907,142 B2 | 6/2005 | Kalevo et al. | |
| 6,980,596 B2 * | 12/2005 | Wang et al. | 375/240.16 |
| 7,031,387 B2 | 4/2006 | Jeon | |
| 7,116,830 B2 | 10/2006 | Srinivasan | |
| 7,154,952 B2 | 12/2006 | Tourapis et al. | |
| 7,170,937 B2 * | 1/2007 | Zhou | 375/240.01 |
| 7,236,524 B2 | 6/2007 | Sun et al. | |
| 2002/0031276 A1 | 3/2002 | Yagishita et al. | |
| 2002/0044601 A1 * | 4/2002 | Haskell et al. | 375/240.2 |
| 2003/0081838 A1 | 5/2003 | Teng | |
| 2003/0206594 A1 | 11/2003 | Zhou | |
| 2003/0223496 A1 | 12/2003 | Sun et al. | |
| 2003/0223645 A1 | 12/2003 | Sun et al. | |
| 2003/0231795 A1 | 12/2003 | Karczewicz | |
| 2006/0126955 A1 | 6/2006 | Srinivasan | |

FOREIGN PATENT DOCUMENTS

JP 05-183758 7/1993
(Continued)

OTHER PUBLICATIONS

Joint Committee Draft (CD), Document JVT-C167, Joint Video Team (JVT) of ISO/IEC MPEG and ITU-T VCEG, May 2002.

(Continued)

*Primary Examiner* — Tung Vo
(74) *Attorney, Agent, or Firm* — Birch Stewart Kolasch & Birch, LLP

(57) ABSTRACT

Embodiments of the present invention relate to methods and systems for ordering, communicating and applying pixel intra-prediction modes.

2 Claims, 10 Drawing Sheets

FOREIGN PATENT DOCUMENTS

| | | |
|---|---|---|
| JP | 08-186823 | 7/1996 |
| JP | 2000295627 | 10/2000 |
| WO | WO00/33583 | 6/2000 |
| WO | WO02/054779 | 7/2002 |

OTHER PUBLICATIONS

Greg Conklin, "New Intra Prediction Modes," document VCEG-N54 doc, ITU-T Video Coding Experts Group (VCEG) Meeting Santa Barara, CA, USA, Sep. 24-28, 2001.

Minhua Zhou, "Scalable Intra Prediction," document JVT-C033 doc, Joint Video Team (JVT) of ISO/IEC MPEG & ITU-T VCEG Meeting Fairfax, Virginia, USA May 6-10, 2002.

H.26L Test Model Long Term No. 6 (TML-6) draft0. [Online], ITU-Telecommunications Standardization Sector Study Group 16 Video Coding Experts Group (VCEG), 2001, pp. 11-14 [retrieved on May 28, 2003].

Iain E G Richardson, H.264/MPEG-4 Part 10:Intra Prediction, pp. 1 of 1-7 of 7, [online], Jul. 10, 2002, H.264/MPEG-4 Part 10 White Paper, [retrieved on Sep. 22, 2003], Retrieved from Internet;,//218.30.21.30/sc/jywd/h264_intrapred.pdf.

Bojun Meng et al; "Fast intra-prediction mode selection for 4x4 blocks in H.264" 2003 IEEE International Conference on Acoustics, Speech, and Signal Processing, Proceedings. (ICASSP). Hong Kong, Apr. 6-10, 2003, IEEE International Conference on Acoustics, Speech, and Signal Processing (ICASSP), New York, NY:IEEE, US, vol. vol. 1 of 6, Apr. 6, 2003, pp. 111389-111392, XPO1O639091 ISBN: 0-7803-7663-3.

H.26L Test Model Long Term No. 6 (TML-6) Draft O ITU-T Telecommunication Standardization Sector of ITU Geneva, CH, Jan. 9, 2001, pp. 1-35, XO0108915 *paragraph '3.4 Intra prediction mode (Intra pred_mode)* *tables 1,2.

Weigand T: "Joint Model No. 1, Revision 1(JM-IRL)" ITU Study Group 16—Video Coding Experts Group, Dec. 3, 2001, pp. 1, 3-75, ZPO01086627 *paragraph '3.4.3 Intra Prediction Mode (Intra pred—mode)!*.

Pan F. et al: "Fast Mode Decision for Intra Predicition" Joint Video Team (JVT) of ISO/IEC MPEG & ITU_T VCEG (ISO/IEC JTC1/SC29/WG11 and ITU-T SG16 Q.6), Document JVT-GO13, 'Online! Mar. 7, 2003, pp. 1-22, XP002325066 Retrieved from the internet: URL:hhp//ftp3.itu.int/av-arch/jvt-site/2003_03_Pattaya/JVT-G013.doc>'retrieved on Mar. 23, 2005!.

U.S. Appl. No. 10/404,211—Office Action dated May 31, 2006.
U.S. Appl. No. 10/404,211—Office Action dated Nov. 14, 2006.
U.S. Appl. No. 10/404,211—Notice of Allowance dated Jun. 21, 2007.
U.S. Appl. No. 10/404,211—Notice of Allowance dated Aug. 2, 2007.
U.S. Appl. No. 10/404,293—Office Action dated Aug. 12, 2006.
U.S. Appl. No. 10/404,293—Notice of Allowance dated Jan. 23, 2007.
U.S. Appl. No. 10/404,293—Notice of Allowance dated Mar. 6, 2007.
U.S. Appl. No. 10/404,298—Office Action dated Sep. 20, 2006.
U.S. Appl. No. 10/404,298—Office Action dated Mar. 19, 2007.
U.S. Appl. No. 10/404,298—Office Action dated Jul. 11, 2007.
U.S. Appl. No. 10/404,298—Notice of Allowance dated Feb. 7, 2008.

* cited by examiner

METHODS AND SYSTEMS FOR IMAGE INTRA-PREDICTION MODE MANAGEMENT

RELATED REFERENCES

This application is a continuation of U.S. patent application Ser. No. 10/404,298, entitled, "Methods and Systems for Image Intra-Prediction Mode Organization, filed Mar. 31, 2003 now U.S. Pat. No. 7,386,048; which claims the benefit of U.S. Provisional Patent Application No. 60/319,272 filed May 28, 2002 and which claims the benefit of U.S. Provisional Patent Application No. 60/319,390, filed Jul. 11, 2002. All applications listed in this paragraph are hereby incorporated herein by reference.

BACKGROUND

Embodiments of the present invention relate to intra-prediction for an image.

Digital video requires a large amount of data to represent each and every frame of a digital video sequence (e.g., series of frames) in an uncompressed manner. It is not feasible for most applications to transmit uncompressed digital video across computer networks because of bandwidth limitations. In addition, uncompressed digital video requires a large amount of storage space. The digital video is normally encoded in some manner to reduce the storage requirements and reduce the bandwidth requirements.

One technique for encoding digital video is interframe encoding. Interframe encoding exploits the fact that different frames of video typically include regions of pixels, normally selected as x by x blocks, that remain substantially the same. During the encoding process a motion vector interrelates the movement of a block of pixels in one frame to a block of similar pixels in another frame. Accordingly, the system is not required to encode the block of pixels twice, but rather encodes the block of pixels once and provides a motion vector to predict the other block of pixels.

Another technique for encoding digital video is intraframe encoding. Intraframe encoding encodes a frame or a portion thereof without reference to pixels in other frames.

Typically intraframe encoding encodes the frame, or portions thereof, on a block by block basis. For example, in MEPG-2 the intraframe encoding makes use of discrete cosine transforms of a block of pixels and subsequent encoding of the transformed coefficients. Other intraframe encoding techniques exist, such as for example, wavelet encoding.

In general, these techniques employ relatively large data tables for referencing prediction modes. Memory for these data tables can be burdensomely expensive for many low cost machines. Moreover, it is also burdensomely expensive to provide sufficient memory within processing devices to store the data table. Also, the resulting system has increased complexity with the large data table.

BRIEF DESCRIPTION OF THE SEVERAL DRAWINGS

The following drawings depict only typical embodiments of the present invention and are not therefore to be considered to be limiting of its scope, the invention will be described and explained with additional specificity and detail through the use of the accompanying drawings in which.

DETAILED DESCRIPTION OF EXEMPLARY EMBODIMENTS

Embodiments of the present invention comprise methods and systems related to intra-prediction of images. As all embodiments are related to intra-prediction, the terms "intra-prediction" and "prediction" may be used interchangeably to refer to intra-prediction processes.

Embodiments of the present invention use intraframe coding or intracoding to exploit spatial redundancies within a video image. Because adjacent blocks generally have similar attributes, the efficiency of the coding process is improved by referencing the spatial correlation between adjacent blocks. This correlation may be exploited by prediction of a target block based on prediction modes used in adjacent blocks.

Figure 1:
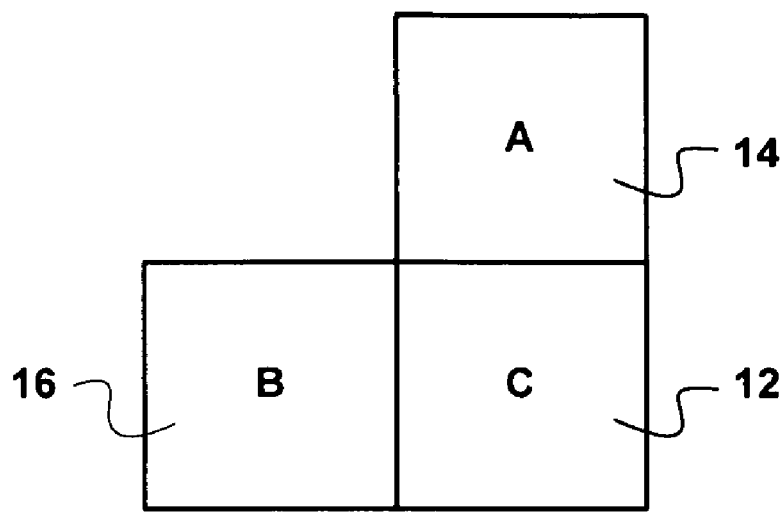
FIG. 1 illustrates some forms of block adjacency.

A digital image may be divided into blocks for more efficient processing or for other reasons. As illustrated in FIG. 1, a target block "C" 12 may be situated adjacent to adjacent block "A," 14 which is located immediately above target block "C" 12. Another adjacent block "B" 16 is located immediately to the left of target block "C" 12. Other blocks that share boundaries with target block "C" 12 may also be considered to be adjacent blocks to block "C" 12.

Blocks may comprise various numbers of pixels in different configurations. For example, a block may comprise a 4×4 array of pixels. A block may also comprise a 16×16 array of pixels or an 8×8 array. Other pixel configurations, including both square and rectangular arrays may also make up a block.

Figure 2:
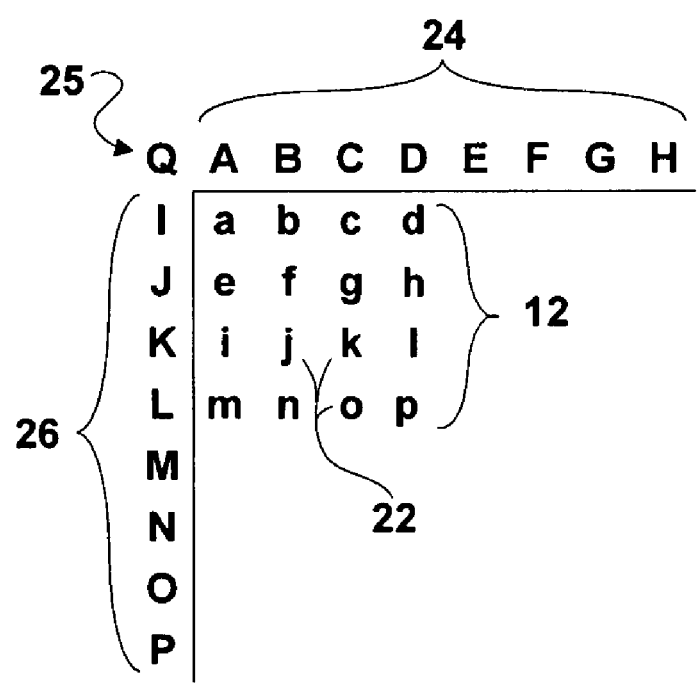
FIG. 2 illustrates a block of pixels and the adjacent pixels for prediction.

Each pixel in a target block may be predicted with reference to data regarding pixels in adjacent blocks. This adjacent pixel data or adjacent block data comprises the prediction modes used to predict those adjacent blocks or adjacent pixels. Specific adjacent pixels and pixels within a target block may be referenced using an alphanumeric index as illustrated in FIG. 2. FIG. 2 illustrates a 4×4 target block, such as block "C" 12 comprising 16 pixels designated by lower case alphabetic characters 22. Pixels in an adjacent block immediately above the target block are designated by capital alphabetic characters 24. Pixels in an adjacent block immediately to the left of the target block are designated by capital alphabetical characters 26. The bottom right pixel 25 in an adjacent block above and to the left of the target block 12 is designated by the capital letter "Q".

Prediction modes may comprise instructions or algorithms for predicting specific pixels in a target block. These modes may refer to one or more adjacent block pixels as described in the following mode descriptions.

Prediction Modes

Mode 0: Vertical Prediction
a, e, i, m may be predicted by A
b, f, j, n, may be predicted by B,
c, g, k, o, may be predicted by C
d, j, l, p may be predicted by D Mode 1: horizontal prediction
a, b, c, d, may be predicted by I
e, f, g, h, may be predicted by J
i, j, k, l, may be predicted by K
m, n, o, p, may be predicted by L Mode 2: DC Prediction If all samples A, B, C, D, I, J, K, L, are available, all samples may be predicted by (A+B+C+D+I+J+K+L+4)>>3. If A, B, C, and D are not available and I, J, K, and L are available, all samples may be predicted by (I+J+K+L+2)>>2. If I, J, K, and L are not available and A, B, C, and D are available, all samples may be predicted by (A+B+C+D+2)>>2. If all eight samples are not available, the prediction for all luma samples in the block may be 128. A block may be always predicted in this mode.

Mode 3: Diagonal Down/Left Prediction

| | |
|---|---|
| a may be predicted by | (A + 2B + C + I + 2J + K + 4) >> 3 |
| b, e may be predicted by | (B + 2C + D + J + 2K + L + 4) >> 3 |
| c, f, i may be predicted by | (C + 2D + E + K + 2L + M + 4) >> 3 |
| d, g, j, m may be predicted by | (D + 2E + F + L + 2M + N + 4) >> 3 |
| h, k, n may be predicted by | (E + 2F + G + M + 2N + O + 4) >> 3 |
| l, o may be predicted by | (F + 2G + H + N + 2O + P + 4) >> 3 |
| p may be predicted by | (G + H + O + P + 2) >> 2 |

Mode 4: Diagonal Down/Right Prediction

| | |
|---|---|
| m may be predicted by | (J + 2K + L + 2) >> 2 |
| i, n may be predicted by | (I + 2J + K + 2) >> 2 |
| e, j, o may be predicted by | (Q + 2I + J + 2) >> 2 |
| a, f, k, p may be predicted by | (A + 2Q + I + 2) >> 2 |
| b, g, l may be predicted by | (Q + 2A + B + 2) >> 2 |
| c, h may be predicted by | (A + 2B + C + 2) >> 2 |
| d may be predicted by | (B + 2C + D + 2) >> 2 |

Mode 5: Vertical-Left Prediction

| | |
|---|---|
| a, j may be predicted by | (Q + A + 1) >> 1 |
| b, k may be predicted by | (A + B + 1) >> 1 |
| c, l may be predicted by | (B + C + 1) >> 1 |
| d may be predicted by | (C + D + 1) >> 1 |
| e, n may be predicted by | (I + 2Q + A + 2) >> 2 |
| f, o may be predicted by | (Q + 2A + B + 2) >> 2 |
| g, p may be predicted by | (A + 2B + C + 2) >> 2 |
| h may be predicted by | (B + 2C + D + 2) >> 2 |
| i may be predicted by | (Q + 2I + J + 2) >> 2 |
| m may be predicted by | (I + 2J + K + 2) >> 2 |

Mode 6: Horizontal-Down Prediction

| | |
|---|---|
| a, g may be predicted by | (Q + I + 1) >> 1 |
| b, h may be predicted by | (I + 2Q + A + 2) >> 2 |
| c may be predicted by | (Q + 2A + B + 2) >> 2 |
| d may be predicted by | (A + 2B + C + 2) >> 2 |
| e, k may be predicted by | (I + J + 1) >> 1 |
| f, l may be predicted by | (Q + 2I + J + 2) >> 2 |
| i, o may be predicted by | (J + K + 1) >> 1 |
| j, p may be predicted by | (I + 2J + K + 2) >> 2 |
| m may be predicted by | (K + L + 1) >> 1 |
| n may be predicted by | (B + 2C + D + 2) >> 2 |

Mode 7: Vertical-Right Prediction

| | |
|---|---|
| a may be predicted by | (2A + 2B + J + 2K + L + 4) >> 3 |
| b, i may be predicted by | (B + C + 1) >> 1 |
| c, j may be predicted by | (C + D + 1) >> 1 |
| d, k may be predicted by | (D + E + 1) >> 1 |
| l may be predicted by | (E + F + 1) >>1 |
| e may be predicted by | (A + 2B + C + K + 2L + M + 4) >> 3 |
| f, m may be predicted by | (B + 2C + D + 2) >> 2 |
| g, n may be predicted by | (C + 2D + E + 2) >> 2 |
| h, o may be predicted by | (D + 2E + F + 2) >> 2 |
| p may be predicted by | (E + 2F + G + 2) >> 2 |

Mode 8: Horizontal-Up Prediction

| | |
|---|---|
| a may be predicted by | (B + 2C + D + 2I + 2J + 4) >> 3 |
| b may be predicted by | (C + 2D + E + I + 2J + K + 4) >> 3 |
| c, e may be predicted by | (J + K + 1) >> 1 |
| d, f may be predicted by | (J + 2K + L + 2) >> 2 |
| g, i may be predicted by | (K + L + 1) >> 1 |
| h, j may be predicted by | (K + 2L + M + 2) >> 2 |
| l, n may be predicted by | (L + 2M + N + 2) >> 2 |
| k, m may be predicted by | (L + M + 1) >> 1 |
| o may be predicted by | (M + N + 1) >> 1 |
| p may be predicted by | (M + 2N + O + 2) >> 2 |

The ordering process, which is based upon the likelihood of producing a lesser prediction error for each of the modes, increases the coding efficiently, reduces the memory requirements, and may be at least partially mathematically defined.

Figure 3:
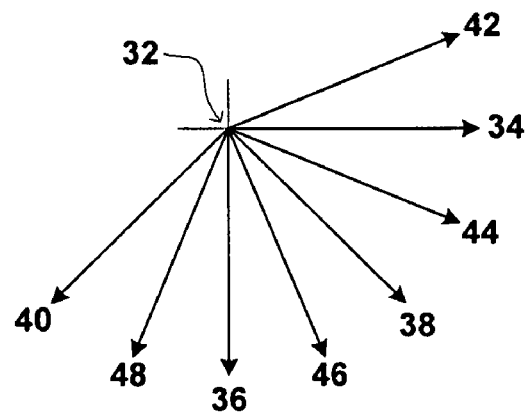
FIG. 3 illustrates general prediction mode directions.

Each prediction mode may be described by a general direction of prediction as described verbally in each of the mode titles above (i.e., horizontal up, vertical and diagonal down left). A prediction mode may also be described graphically by an angular direction. This angular direction may be expressed through a diagram with arrows radiating outward from a center point as shown in FIG. 3. In this type of diagram, each arrow and the center point may represent a prediction mode. The angle corresponding to a prediction mode has a general relationship to the direction from the weighted average location of the adjacent pixels used to predict the target pixel to the actual target pixel location. However, the modes are more precisely defined in the definitions above and in the JVT standard. In FIG. 3, the center point 32 represents no direction so this point may be associated with a DC prediction mode. A horizontal arrow 34 may represent a horizontal prediction mode. A vertical arrow 36 may represent a vertical prediction mode. An arrow extending from the center point diagonally downward to the right at approximately a 45 degree angle from horizontal 38 may represent a Diagonal Down/Right (DDR) prediction mode. An arrow extending from the center point diagonally downward to the left at approximately a 45 degree angle from horizontal 40 may represent a Diagonal Down/Left (DDL) prediction mode. Both the DDR and DDL prediction modes may be referred to as diagonal prediction modes.

An arrow extending from the center point diagonally upward to the right at approximately a 22.5 degree angle from horizontal 42 may represent a Horizontal Up (HU) prediction mode. An arrow extending from the center point diagonally downward to the right at approximately a 22.5 degree angle from horizontal 44 may represent a Horizontal Down (HD) prediction mode. An arrow extending from the center point diagonally downward to the right at approximately a 67.5 degree angle from horizontal 46 may represent a Vertical Right (VR) prediction mode. An arrow extending from the center point diagonally downward to the left at approximately a 67.5 degree angle from horizontal 48 may represent a Vertical Left (VL) prediction mode. The HU, HD, VR and VL prediction modes may be referred to collectively as intermediate angle prediction modes.

Many other prediction modes may be created and described using this angular description scheme.

Prediction Mode Order

The present inventors have determined that prediction modes may be ordered in a manner generally consistent with their likelihood of producing a reduced prediction error. With the prediction modes ordered according to their general likelihood of producing a lesser prediction error, the resulting data itself may have a greater tendency to be more consistently ordered. Furthermore, communication of modes may take advantage of coding techniques that reduce memory and bandwidth requirements. For example, the present inventors determined that the horizontal prediction mode and the vertical prediction mode are generally more likely than diagonal prediction modes, which are generally more likely than intermediate angle prediction modes. In addition, a DC prediction mode (e.g., when an adjacent block is coded in inter mode) is generally less likely than horizontal and vertical prediction modes and generally more likely than diagonal prediction modes.

For blocks that do not border discontinuities such as image edges or swipe/swath boundaries, the order established in some embodiments of the present invention may be expressed, in general terms, as follows: vertical and horizontal prediction modes are more likely to produce a reduced prediction error than a DC prediction mode and that a DC prediction mode is more likely to produce a reduced prediction error than diagonal prediction modes and that diagonal prediction modes are more likely to produce a reduced prediction error than intermediate angle prediction modes.

For blocks near edges or boundaries or where adjacent block or pixel prediction mode data is not available, the order established in some embodiments of the present invention may be expressed, in general terms, as follows: DC prediction mode is more likely to produce a reduced prediction error than vertical and horizontal prediction modes and vertical and horizontal prediction modes are more likely to produce a reduced prediction error than diagonal prediction modes and that diagonal prediction modes are more likely to produce a reduced prediction error than intermediate angle prediction modes.

Figure 4:
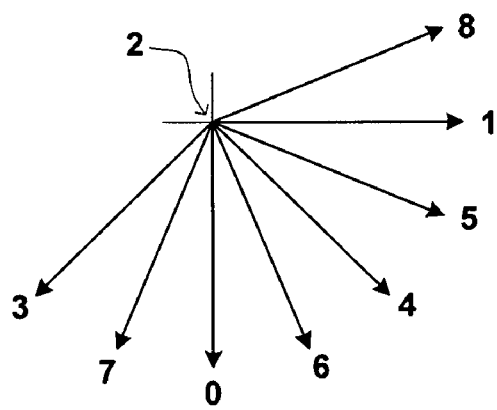
FIG. 4 illustrates the general directions of prediction modes in an embodiment of the present invention.
Figure 5:
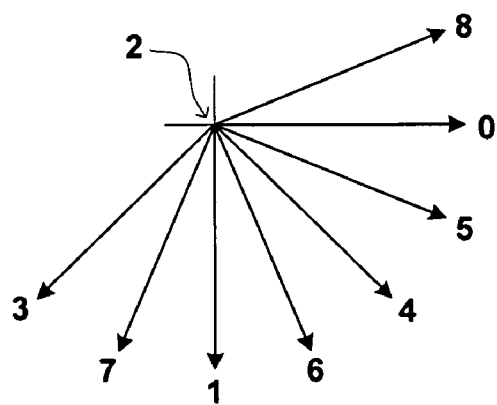
FIG. 5 illustrates the general directions of prediction modes in an embodiment of the present invention.
Figure 6:
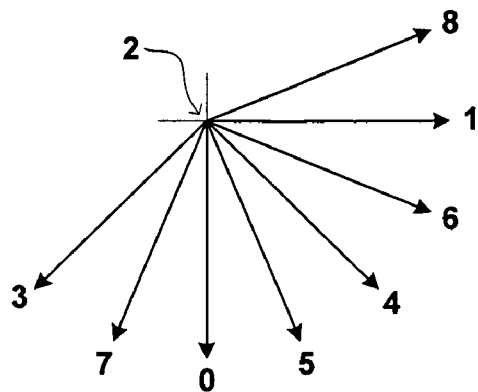
FIG. 6 illustrates the general directions of prediction modes in an embodiment of the present invention.
Figure 7:
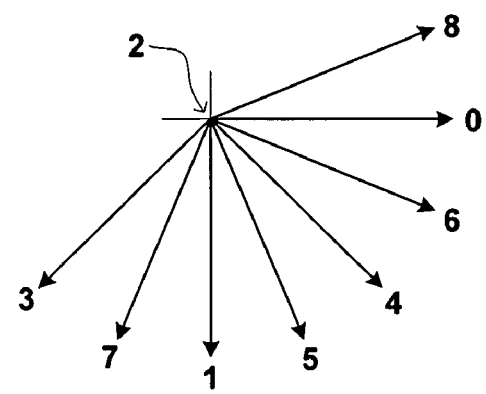
FIG. 7 illustrates the general directions of prediction modes in an embodiment of the present invention.
Figure 8:
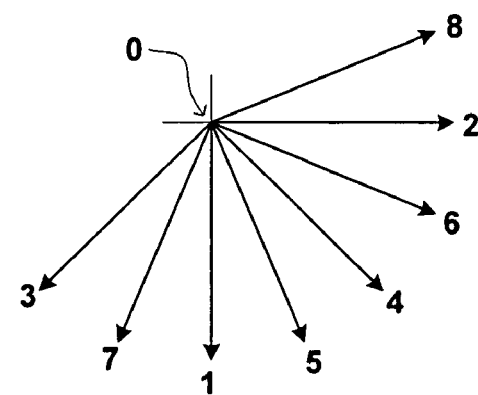
FIG. 8 illustrates the general directions of prediction modes in an embodiment of the present invention.

In a first set of embodiments as illustrated in FIG. 4, modes may be defined in order as follows:
  Mode 0: Vertical prediction
  Mode 1: Horizontal prediction
  Mode 2: DC prediction
  Mode 3: Diagonal Down/Left prediction
  Mode 4: Diagonal Down/Right prediction
  Mode 5: Horizontal Down prediction
  Mode 6: Vertical Right prediction
  Mode 7: Vertical Left prediction
  Mode 8: Horizontal Up prediction In a second set of embodiments, as illustrated in FIG. 5, modes may be defined in order as follows:
  Mode 0: Horizontal prediction
  Mode 1: Vertical prediction
  Mode 2: DC prediction
  Mode 3: Diagonal Down/Left prediction
  Mode 4: Diagonal Down/Right prediction
  Mode 5: Horizontal Down prediction
  Mode 6: Vertical Right prediction
  Mode 7: Vertical Left prediction
  Mode 8: Horizontal Up prediction In a third set of embodiments, as illustrate in FIG. 6, modes may be defined in order as follows:
  Mode 0: Vertical prediction
  Mode 1: Horizontal prediction
  Mode 2: DC prediction
  Mode 3: Diagonal Down/Left prediction
  Mode 4: Diagonal Down/Right prediction
  Mode 5: Vertical Right prediction
  Mode 6: Horizontal Down prediction
  Mode 7: Vertical Left prediction
  Mode 8: Horizontal Up prediction In a fourth set of embodiments, as illustrated in FIG. 7, modes may be defined in order as follows:
  Mode 0: Horizontal prediction
  Mode 1: Vertical prediction
  Mode 2: DC prediction
  Mode 3: Diagonal Down/Left prediction
  Mode 4: Diagonal Down/Right prediction
  Mode 5: Vertical Right prediction
  Mode 6: Horizontal Down prediction
  Mode 7: Vertical Left prediction
  Mode 8: Horizontal Up prediction In a fifth set of embodiments, as illustrated in FIG. 8, modes may be defined in order as follows:
  Mode 0: DC prediction
  Mode 1: Vertical prediction
  Mode 2: Horizontal prediction
  Mode 3: Diagonal Down/Left prediction
  Mode 4: Diagonal Down/Right prediction
  Mode 5: Vertical Right prediction
  Mode 6: Horizontal Down prediction
  Mode 7: Vertical Left prediction
  Mode 8: Horizontal Up prediction It should be noted that the mode order may vary beyond these exemplary orders in various other embodiments of the present invention.

In some embodiments of the present invention, the horizontal prediction (mode 0) and the vertical prediction (mode 1) may be reversed, if desired. Also, it is to be understood that the diagonal down/left prediction mode and the horizontal down prediction mode may be reversed, if desired. In addition, it is to be understood the diagonal down/right prediction (mode 5), the vertical right prediction (mode 6), the vertical left prediction (mode 7), and the horizontal up prediction (mode 8) may be reordered, if desired. Further, it is desirable that the DC prediction is between the mode 0/mode 1 set and the mode 3/mode 4 set, but may be located between mode 3/mode 4 set and mode 5/mode 6/mode 7/mode 8 set, if desired, or any other location. Moreover, the angled modes 3-8 may be renumbered as desired without significant impact on the encoding efficiency.

In some embodiments of the present invention, the prediction modes may be reordered for all of the respective blocks (e.g., those blocks using the described prediction scheme) using such a prediction basis. In addition, less than all of the respective blocks (e.g., those blocks using the described prediction scheme) may use such a prediction basis, for example, more than 50%, 75% or 90%, if desired. Also, the order of the prediction modes may be the same or varied for different blocks. Further, the reordering of each of the modes of such a prediction basis (e.g., in a predetermined consistent manner) is preferably at least 5 modes, 6 modes, or 7 modes, with the remaining being ordered in any other manner. In addition, the order of the prediction modes is preferably 0, 1, 2, 3, 4, 5, 6, 7, 8. Other predefined ordering of the prediction modes may likewise be employed.

Some embodiments of the present invention may comprise one or more data tables for organization of mode data. With the modes being generally arranged in an ordered manner, this may be used together with each cell in a data table, to provide a more ordered set. For example, each entry in the data table may include the ordered set of numbers 0, 1, 2, 3, 4, 5, 6, 7, 8, and 9. Alternatively, the ordered set of numbers in the data table may include 5, 6, 7, 8, or 9 sets of ordered numbers for each entry in the data table. For example, the data table entries may include the following sets of data entries {1, 2, 3, 5, 7}; {0, 1, 2, 3, 4, 5, 6}; {0, 1, 3, 5, 6, 7, 8}, where each of the numbers in the set are of increasing numerical value. Alternatively for example, the data table entries may include the following sets of data entries {1, 2, 3, 5, 7}; {0, 1, 2, 3, 4, 5, 6}; {0, 1, 3, 5, 6, 7, 8}, where each set is included in at least 25%, or 35%, or 50%, or 75%, or 90%, or more, of the cells. In this manner, the table will have significantly more predictability than known data table methods, which decreases memory requirements.

The predetermined manner of the ordering of the sets of data entries should be independent of the prediction modes of adjoining sets of pixels (e.g. macroblocks). It is to be understood that the data table may be "static" in nature or may be effectively dynamically generated, in whole or in part, when needed based upon patterns in the data. Accordingly, a mathematical equation or an algorithm may be used to determine the entries, which in this case the "table" could be created by such a technique. Accordingly, a "data table" as used herein is not merely restricted to a static table, but further includes such a set of values, however determined, that are used for such prediction.

Unfortunately, the substitution of the previous mode numbers with the new mode numbers (e.g., a substitution of numbers into the cells of known data tables), while perhaps an improvement, still results in a generally unordered set of data.

Estimating a Pixel Prediction Mode Based on Adjacent Block Data

In contrast to the generally unordered set of data shown, even with substitutions, the present inventors came to the further realization that the most likely prediction mode should be ordered first, the second most likely prediction mode ordered second, if desired, followed by the remaining modes in a predetermined manner. The predetermined manner should be independent of the prediction modes of adjoining macroblocks. The preferred order of the remaining modes should be in a decreasing likelihood of occurrence of the remaining modes (most likely prediction mode, and if desired, second most likely prediction mode).

Based on the intra prediction modes of block A and block B, as shown in FIG. 1, the intra prediction mode order for block C may be defined as follows:

(1) If both block A and block B are "outside" (e.g., not available), only DC prediction
(mode 2) is permitted, therefore the intra prediction mode order for block C is {2}.
(2) If block A is "outside" (e.g., not available) and block B is not "outside", only DC prediction (mode 2) and horizontal prediction (mode 0) are permitted for block C, therefore;
  (i) if block B is 2, intra prediction mode order for block C is {2, 0};
  (ii) otherwise, intra prediction mode order for block C is {0, 2}.
(3) If block A is not "outside" but block B is "outside", only DC prediction (mode 2) and vertical prediction (mode 1) are permitted for block C, therefore
  (i) if block A is 2, intra prediction mode order for block C is {2, 1};
  (ii) otherwise, intra prediction mode order for block C is {1, 2}.
(4) If neither block A nor block B is "outside",
  (i) if the prediction mode of block A is less than the prediction mode of block B, then intra prediction mode order for block C is {intra prediction block mode A, intra prediction block mode B, other modes in ascending order};
  (ii) if the prediction mode of block A is greater than the prediction mode of block B, then intra prediction mode order for block C is {intra prediction block mode B, intra prediction block mode A, other modes in ascending order};
  (iii) if the prediction mode of block A equals the prediction mode of block B, then intra prediction mode order for block C is {intra prediction block mode A, other modes in ascending order}.

For example, if the prediction mode of block A is 3 and the prediction mode of block B is 1, then intra prediction mode order for block C is {1, 3, 0, 2, 4, 5, 6, 7, 8}. With the modes arranged in a generally decreasing likelihood (or increasing) of occurrence, then the automatic arrangement of the remaining modes of occurrence will still be generally arranged in the proper sequence. The ordering of the sequence from higher to lower probability increases the likelihood of the proper prediction toward the front. With entropy encoding this decreases the resulting encoded bit stream. Other arrangements may likewise be used.

Conceptually the aforementioned selection scheme is based upon the principle that if the prediction of block A is X and the prediction of block B is Y, then it is likely the prediction of block C is X or Y. The prediction for X and/or Y is located at the start of the list and the remaining modes are sequentially listed thereafter.

Stated another way, when the prediction modes of A and B are known (including the case that A or B or both are outside the slice) the most probable mode of C is given, namely, the minimum of the modes used for blocks A and B. If one of the blocks A or B is "outside" the most probable mode is equal to prediction mode 2. The ordering of prediction modes assigned to blocks C is therefore the most probable mode followed by the remaining modes in the ascending order.

Figure 9:
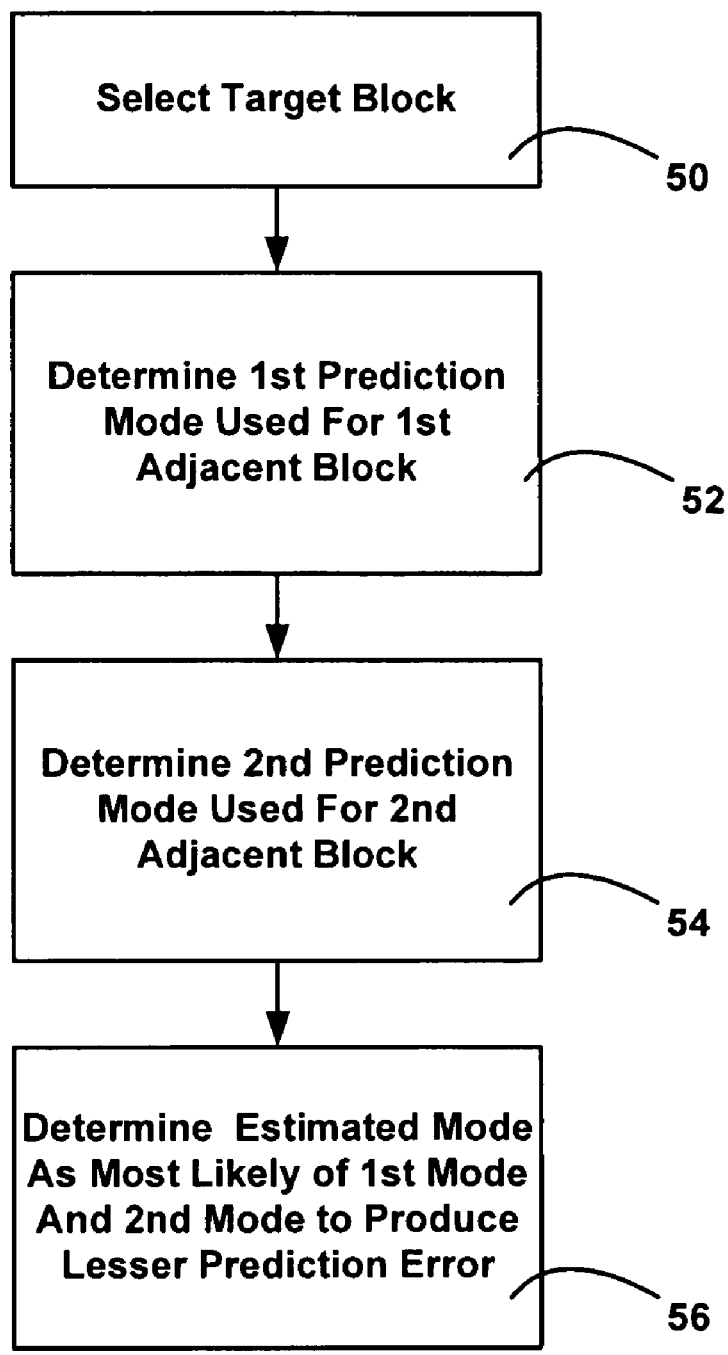
FIG. 9 is a block diagram illustrating mode estimation in some embodiments of the present invention

Embodiments of the present invention may be described with reference to FIG. 9. In these embodiments, a target block is selected 50 for prediction. A prediction mode used for prediction of a first adjacent block, which is immediately adjacent to said target block, is then determined 52. A prediction mode used for prediction of a second adjacent block, which is also adjacent to said target block is also determined 54. These adjacent block prediction modes are then examined 56 to determine which is more likely to produce a lesser prediction error.

Figure 10:
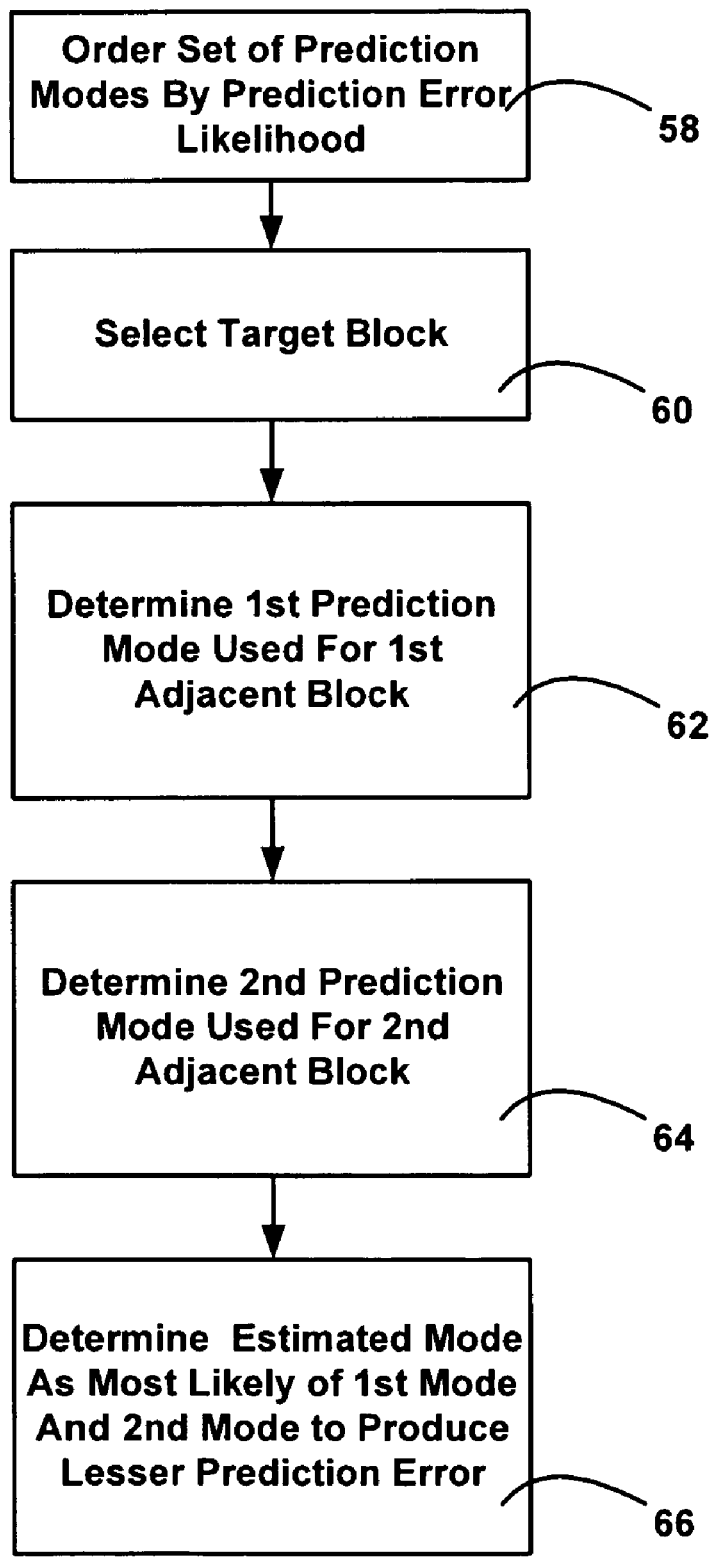
FIG. 10 is a block diagram illustrating mode estimation in embodiments with an ordered set of prediction modes.

In other embodiments of the present invention, as illustrated in FIG. 10, a set of prediction modes is ordered 58 according to the modes' likelihood of producing a lesser prediction error. A target block is selected 60. The prediction mode used for a first adjacent block is determined 62 and the prediction mode used for a second adjacent block is also determined 64. These two prediction modes are then examined 66 to determine which occurs first in the ordered set of modes thereby corresponding to the mode with the higher likelihood of producing a lesser prediction error.

Figure 11:
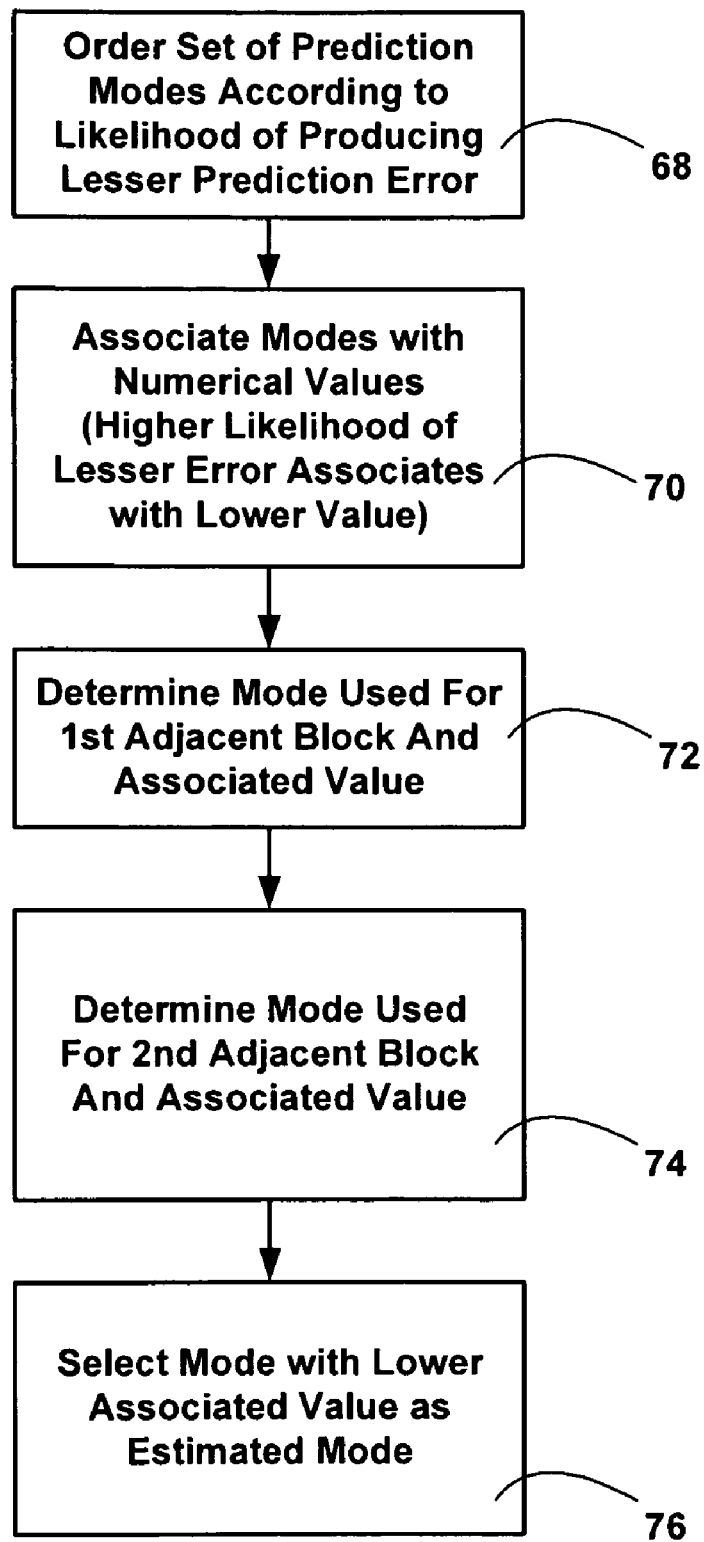
FIG. 11 is a block diagram illustrating mode estimation with ordered sets associated with numerical values.

In further embodiments of the present invention, as illustrated in FIG. 11, a set of prediction modes is ordered 68 by likelihood of producing a lesser prediction error. These modes in the ordered set are then associated 70 with numerical values such that modes with a higher likelihood of producing a lesser prediction error are associated with lower numerical values. The mode used to predict a first adjacent block is then determined 72 and the mode used to predict a second adjacent block is also determined 74. These adjacent block modes are then examined to determine which mode is associated with a lower numerical value. This mode is designated as the estimated mode for prediction of the target block 76.

Figure 12:
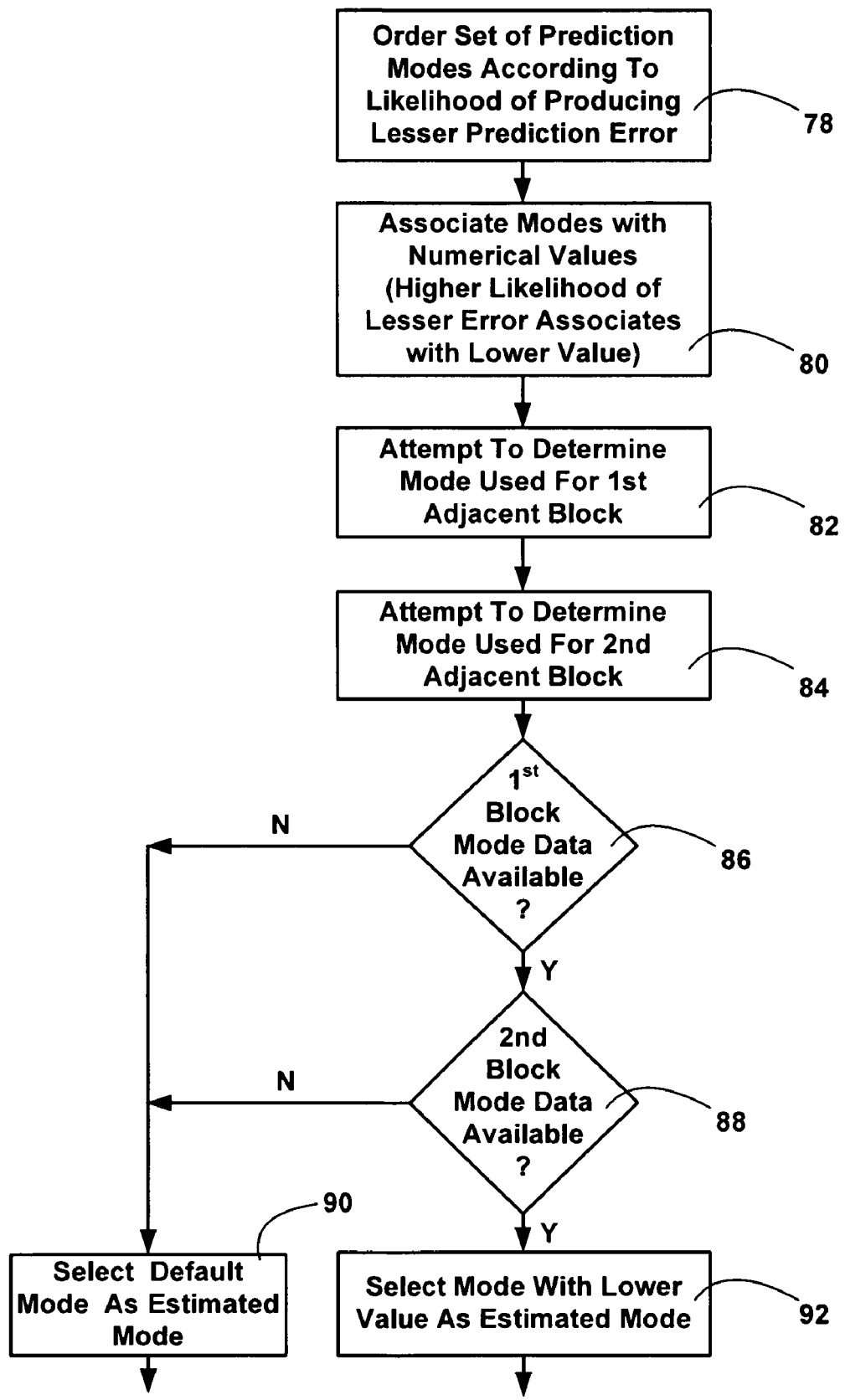
FIG. 12 is a block diagram illustrating mode estimation options when some adjacent block data is unavailable.

In still further embodiments, as illustrated in FIG. 12, a set of prediction modes is ordered 78 by likelihood of producing a lesser prediction error. These modes in the ordered set are then associated 80 with numerical values such that modes with a higher likelihood of producing a lesser prediction error are associated with lower numerical values. An attempt 82 is made to determine the mode used to predict a first adjacent block and an attempt 84 is made to determine the mode used to predict a second adjacent block. If the prediction mode used to predict the first adjacent block is not available 86, a default prediction mode, such as a DC prediction mode, may be designated 90 as an estimated prediction mode for the target block. Also, if the prediction mode used to predict the second adjacent block is not available 88, a default prediction mode, such as a DC prediction mode, may be designated 90 as an estimated prediction mode for the target block. When the adjacent block prediction modes are available, these adjacent block modes may be examined to determine which mode is associated with a lower numerical value. This mode is then designated 92 as the estimated mode for prediction of the target block.

Modification of Prediction Mode Order Based on Adjacent Block Data

In some embodiments of the present invention the prediction mode orders described above, which have been determined independently of the adjacent block data, may be modified with adjacent block data. Prediction mode estimates determined with reference to adjacent block data can be inserted into prediction mode orders to modify the orders to reflect the additional information obtained from adjacent block data.

In some of these embodiments, a prediction mode estimate, based on adjacent block data, can be inserted directly into a prediction mode order set. Typically, the prediction mode estimate will be inserted or prepended at the front of the prediction mode order at the position of the mode most likely to produce a reduced prediction error. However, in some embodiments the estimate may be inserted at different positions in the mode order.

Figure 13:
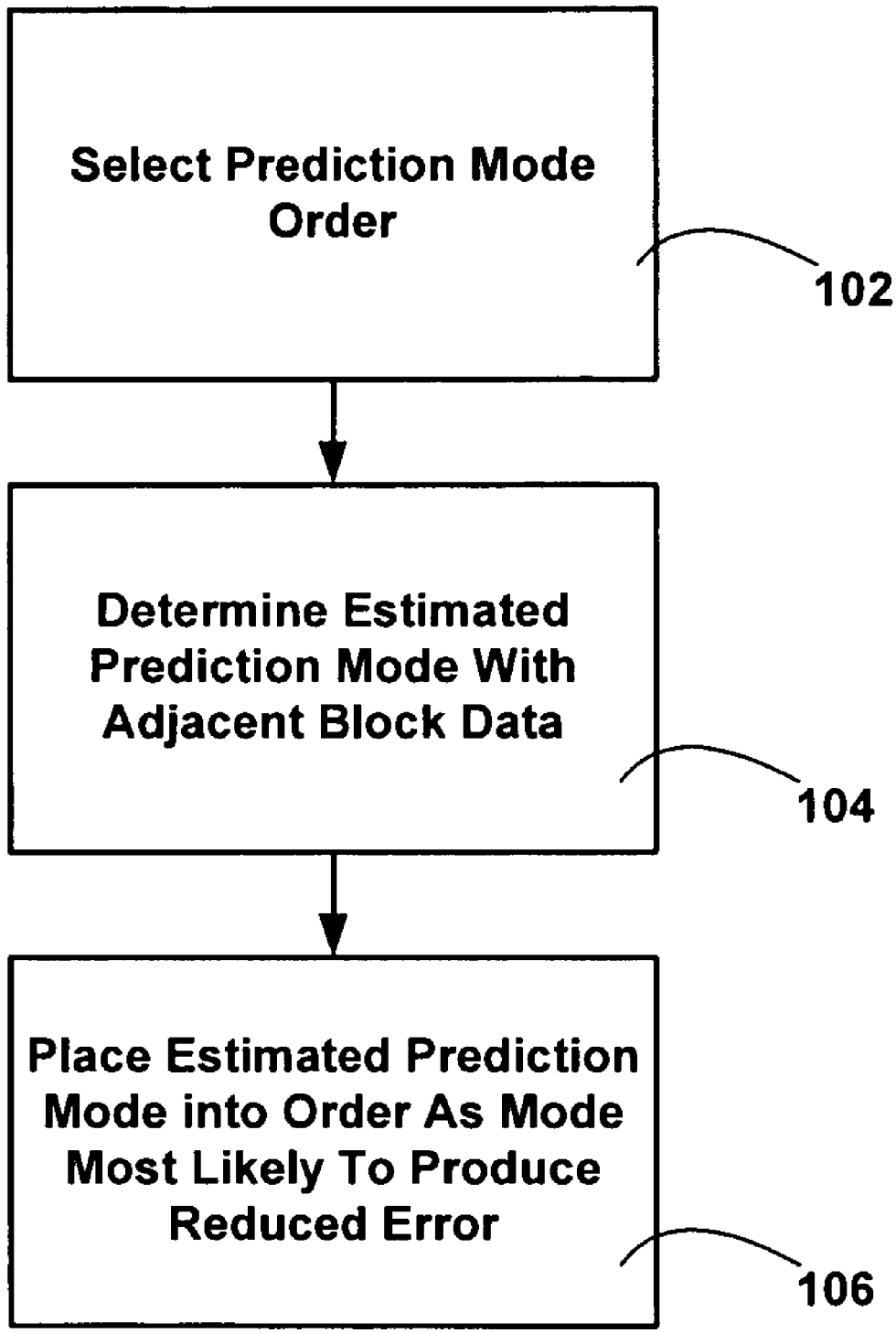
FIG. 13 is a block diagram illustrating mode order modification in some embodiments of the present invention.

In some embodiments of the present invention, as shown in FIG. 13, a prediction mode order is selected 102 wherein the prediction mode order elements may be arranged according to their likelihood of producing a lesser prediction error. In other words, the first element in the order represents the prediction mode most likely to yield a lesser prediction error, the next element in the order represents the prediction mode that is the next most likely to yield a lesser prediction error and so on to the last element in the order, which represents the prediction mode in the order that is least likely to yield a lesser prediction error.

A prediction mode estimate is also determined 104, as described above. This estimate is determined using adjacent block data. Generally, the estimate is the prediction mode used in one or more adjacent blocks that is likely to yield a lesser prediction error. However, the estimate may be determined in other ways. When sufficient adjacent block prediction mode data is not available, such as at an image edge or a slice boundary, a prediction mode for the target block may be estimated based on the lack of one or more adjacent blocks or their prediction mode data. In many cases, a DC prediction mode will be estimated when adjacent block data is limited or unavailable.

In some embodiments, once the estimated prediction mode is estimated, the estimated prediction mode may be placed 106 into the mode order as the mode most likely to yield a lesser prediction error. In some embodiments, this will be the first mode in the order or the mode associated with the lowest numerical value.

Figure 14:
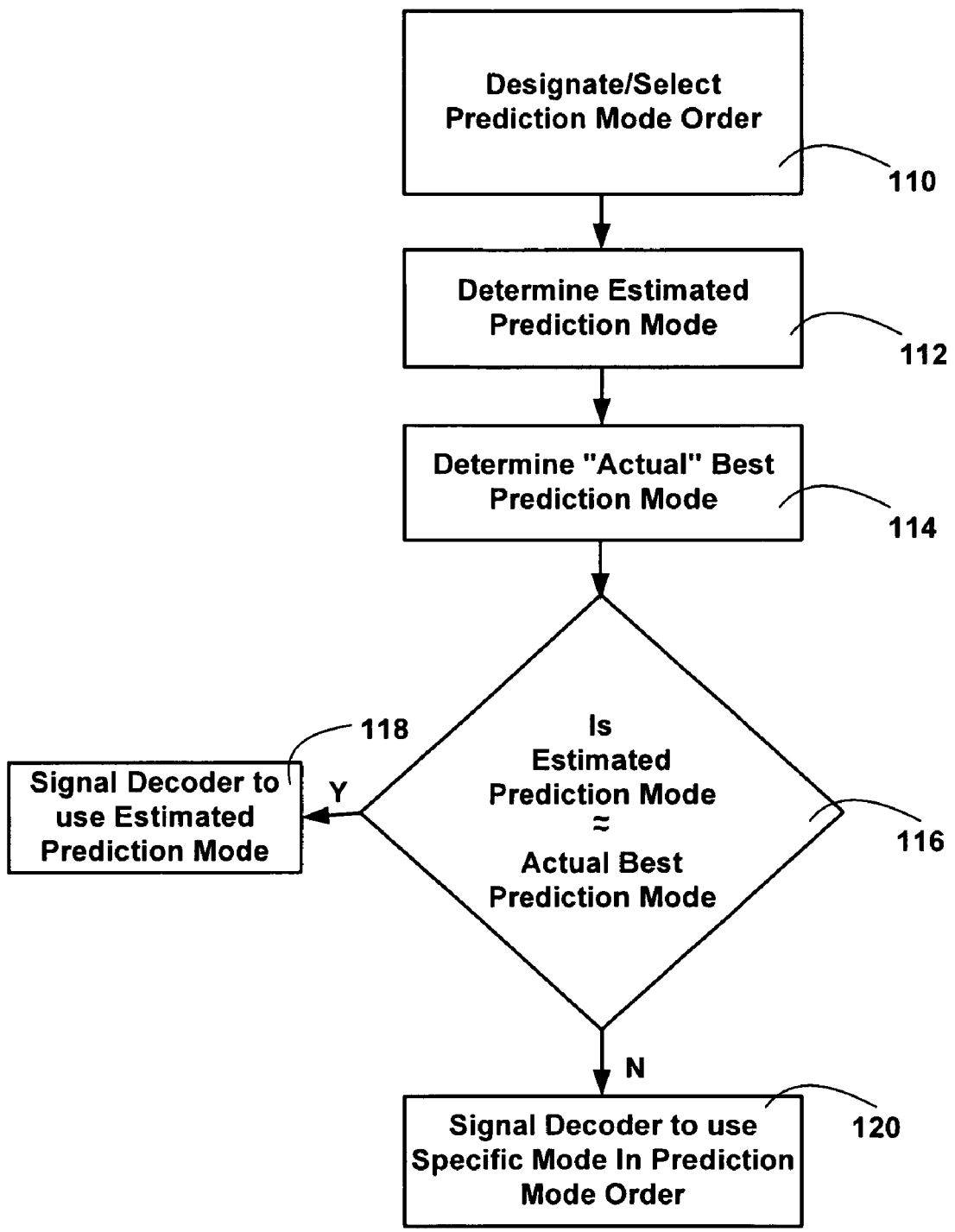
FIG. 14 is a block diagram illustrating the methods of an embodiment of the present invention in which an estimated mode is used to modify mode order usage.

In other embodiments, the estimated prediction mode may take precedence over the pre-selected mode order. In some of these embodiments, as illustrated in FIG. 14, a pre-selected mode order is designated 110 at the encoder and the decoder. This order comprises a set of prediction modes arranged in order of likelihood of yielding a lesser prediction error or some other order. An estimated prediction mode is also determined 112 based on adjacent block data. This estimated prediction mode is determined at the encoder and the decoder according to the same algorithm or method. The encoder also determines the actual best prediction mode 114 for predicting a pixel based on motion vectors or other known techniques. The encoder may, then, compare 116 the actual best prediction mode to the estimated prediction mode to determine whether they are the same. If the estimated prediction mode is the same mode as the actual best prediction mode, the encoder may signal to the decoder that the estimated prediction mode is to be used 118. In some embodiments, this estimated prediction mode signal may be performed with a 1-bit flag to signify whether the estimated mode is to be used on not.

If the estimated prediction mode is not the actual best prediction mode, the encoder may signal to the decoder that another mode may be used 120. This may be performed by reference to the pre-established mode order. The encoder may determine which mode in the mode order is most equivalent to the actual best prediction mode and signal the decoder to use that mode.

When an ordered set of prediction modes is used, the set order may be rearranged once further data is obtained. For example, an ordered set of prediction modes may be re-ordered when an estimated prediction mode is determined or when a best actual prediction mode is determined. In these cases, the modifying mode may be interjected into the ordered set, placed ahead of the ordered set or, in some cases, removed from the ordered set.

Figure 15:
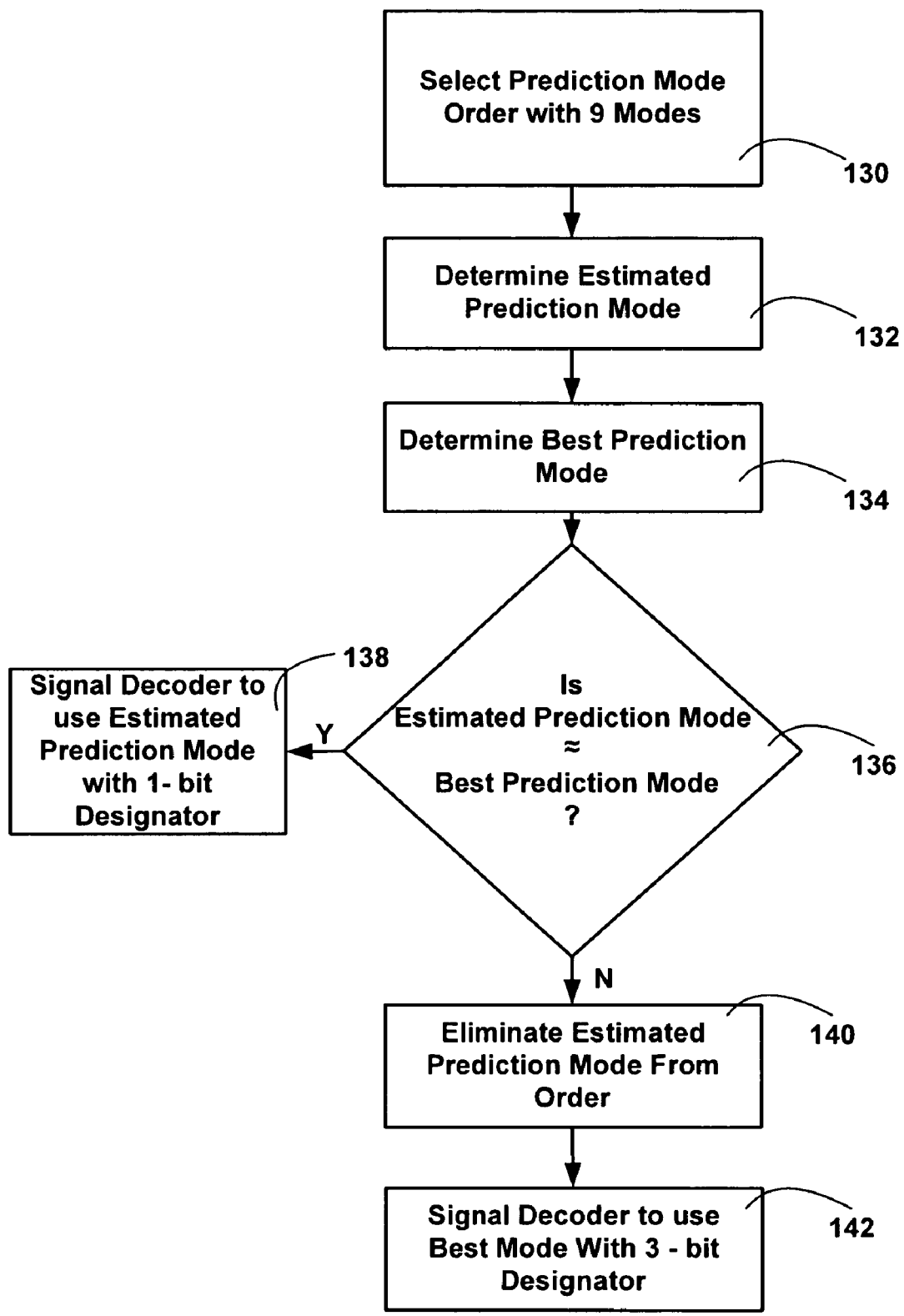
FIG. 15 is a block diagram illustrating the method of an embodiment of the present invention in which an estimate mode is used to modify mode order using specific designators.

In some embodiments of the present invention, each mode in the mode order may be associated with a numerical value according to the order. In these embodiments, the numerical value associated with the mode to be used may be sent to the decoder to signal the decoder to use that prediction mode. In some of these embodiments, as illustrated in FIG. 15, a mode order comprising 9 prediction modes may be selected 130. An estimated prediction mode based on adjacent block data, and which is one of the 9 modes in the order, may also be determined 132. A best prediction mode may also be determined 134 by motion vector methods or other methods. The best prediction mode may then be compared to the estimated prediction mode 136. If the estimated prediction mode is substantially the same as the best prediction mode, the decoder may be signaled with a 1-bit designator to use the estimated prediction mode, which is already identified at the decoder 138. If the estimated prediction mode is not equivalent to the best prediction mode, the estimated prediction mode is essentially eliminated from the mode order 140. This elimination may be performed by re-ordering the set, skipping the estimated mode in the order or by other means. The remaining order will effectively comprise 8 modes, which can be represented by a 3-bit designator. This 3-bit designator may be sent to the decoder 142 to designate which mode to use for prediction.

The terms and expressions employed in the foregoing specification are used therein as terms of description and not of limitation, and there is no intention in the use of such terms and expressions of excluding equivalents of the features shown and described or portions thereof, it being recognized that the scope of the invention is defined and limited only by the claims that follow.

What is claimed is:

1. An image encoding system for encoding a digital image comprising:
   a) means for encoding each of the blocks into which an image is divided;
   b) intra-prediction means for predicting a pixel value of a target block to be coded by using at least one pixel value of a block adjacent to the target block; and
   c) prediction mode estimating means for estimating a prediction mode for the target block, wherein the intra-prediction means includes means to perform a vertical prediction mode using prediction values being the pixel values of a first block located adjacent to and above the target block;
   d) means to perform a horizontal prediction mode using prediction values being the pixel values of a second block located adjacent to and to the left side of the target block, and;
   e) means to perform a DC prediction mode using a prediction value being an average of the pixel values of the first and second blocks,
   characterized by:
   f) the prediction modes being numbered with serially larger numbers, in order of the vertical prediction mode, the horizontal prediction mode and the DC prediction mode, or in order of the horizontal prediction mode, the vertical prediction mode and the DC prediction mode, and wherein the prediction mode estimating means determines a prediction mode to have the lower mode number among the prediction mode of the first block and the prediction mode of the second block as the estimated prediction mode for the target block, and
   g) prediction mode encoding means for encoding a first information and a second information, wherein the first information indicates whether an actual prediction mode for the target block is equivalent to the estimated prediction mode and the second information indicates the actual prediction mode if the actual prediction mode is not equivalent to the estimated prediction mode.

2. An image decoding system for decoding an encoded digital image comprising:
   a) means for decoding each of the blocks into which an image is divided;
   b) intra-prediction means for predicting a pixel value of a target block to be decoded by using at least one pixel value of a block adjacent to the target block; and
   c) prediction mode estimating means for estimating a prediction mode for the target block, wherein the intra-prediction means includes means to perform a vertical prediction mode using prediction values being the pixel values of a first block located adjacent to and above the target block;
   d) means to perform a horizontal prediction mode using prediction values being the pixel values of a second block located adjacent to and to the left side of the target block; and
   e) means to perform a DC prediction mode using a prediction value being an average of the pixel values of the first and second blocks,
   characterized by:
   f) the prediction modes being numbered with serially larger numbers, in order of the vertical prediction mode, the horizontal prediction mode and the DC prediction mode, or in order of the horizontal prediction mode, the vertical prediction mode and the DC prediction mode; and
   g) wherein the prediction mode estimating means determines a prediction mode to have the lower mode number among the prediction mode of the first block and the prediction mode of the second block as the estimated prediction mode for the target block, and
   h) prediction mode decoding means for decoding a first information and a second information, wherein the first information indicates whether an actual prediction mode for the target block is equivalent to the estimated prediction mode and the second information indicates the actual prediction mode if the actual prediction mode is not equivalent to the estimated prediction mode.

* * * * *